US008782213B2

(12) United States Patent
Hsu et al.

(10) Patent No.: US 8,782,213 B2
(45) Date of Patent: Jul. 15, 2014

(54) SYSTEM AND METHOD FOR THE APPLICATION OF PSYCHROMETRIC CHARTS TO DATA CENTERS

(76) Inventors: Ching-I Hsu, Warren, NJ (US); Siva Somasundaram, Dayton, NJ (US); Neil Weinstock, Randolph, NJ (US)

( * ) Notice: Subject to any disclaimer, the term of this patent is extended or adjusted under 35 U.S.C. 154(b) by 6 days.

(21) Appl. No.: 13/038,201

(22) Filed: Mar. 1, 2011

(65) Prior Publication Data

US 2012/0030347 A1 Feb. 2, 2012

Related U.S. Application Data

(60) Provisional application No. 61/309,368, filed on Mar. 1, 2010.

(51) Int. Cl.
*G06F 15/173* (2006.01)
(52) U.S. Cl.
USPC ....... 709/224; 709/229; 370/328; 340/870.01
(58) Field of Classification Search
USPC ............... 709/224, 229; 370/328; 340/870.01
See application file for complete search history.

(56) References Cited

U.S. PATENT DOCUMENTS

| | | | | |
|---|---|---|---|---|
| 6,073,480 A * | 6/2000 | Gokhfeld | | 73/29.02 |
| 8,172,154 B1 * | 5/2012 | Figley et al. | | 236/44 A |
| 8,244,502 B2 * | 8/2012 | Hamann et al. | | 703/1 |
| 2004/0263351 A1 * | 12/2004 | Joy et al. | | 340/870.01 |
| 2006/0010388 A1 * | 1/2006 | Imhof et al. | | 715/734 |
| 2006/0101324 A1 * | 5/2006 | Goldberg et al. | | 715/503 |
| 2006/0234621 A1 * | 10/2006 | Desrochers et al. | | 454/239 |
| 2008/0221798 A1 * | 9/2008 | Pariag et al. | | 702/9 |
| 2009/0252087 A1 * | 10/2009 | Jiang et al. | | 370/328 |

OTHER PUBLICATIONS

2008 ASHRAE Environmental Guidelines for Datacom Equipment, Expanding the Recommended Environmental Envelope, ASHRAE, 2008.*

* cited by examiner

*Primary Examiner* — Rupal Dharia
*Assistant Examiner* — Van Kim T Nguyen

(57) ABSTRACT

A system and method of displaying the temperature and relative humidity data of sensors on a psychrometric chart. The system and method operate to display an environmental envelope on the psychrometric chart in order to compare the data of the sensors to the environmental envelope of the psychrometric chart, in order to ensure safe operating conditions for data center equipment.

13 Claims, 7 Drawing Sheets

```
Const pressure = 1013.25;

Function dewpoint(temp, rh) {
    Const a = 17.271;
    Const b = 237.7;

Var Gamma = (a * temp) / (b * temp) + log(rh / 100);
    Var Dewpoint = (b * gamma) / (a – gamma);

Return(dewpoint);
}

Function dewpoint2mixratio(dewpoint) {
    Var e = 6.11 * (10 ** (7.5 * dewpoint / (237.7 + dewpoint)));
    Var mixratio = 621.97 * e / (pressure - e);
    return(mixratio);
}

Function mixratio(temp, rh) {
    Var dewpoint = dewpoint(temp, rh);
    Var mixratio = dewpoint2mixratio(dewpoint);
    Return(mixratio);
}
```

Fig. 7

SYSTEM AND METHOD FOR THE APPLICATION OF PSYCHROMETRIC CHARTS TO DATA CENTERS

BACKGROUND

The invention relates to the application of psychrometric charts to data centers, and more particularly relates to the application of psychrometric charts to interpretation of sensor data in data centers.

A data center is a facility used to house computer systems and associated components. The electronic components of computer systems give off heat. However, these electronic components may malfunction or be damaged in the presence of excessive heat. Further, these electronic components may be damaged by both excessive and too little humidity. In the case of excessive humidity, condensation may occur. In the case of too little humidity, the occurrence of electrostatic discharge becomes more frequent. Therefore, the physical environment of a data center is rigorously controlled. Air-conditioning is used to control both the temperature and humidity in data centers.

The American Society of Heating, Refrigerating and Air Conditioning Engineers (ASHRAE) has published a number of guidelines to data center environmental conditions widely used in the data center industry. These guidelines include ASHRAE Publication "Thermal guidelines for Data Centers and other Data Processing Environments", Atlanta, 2004 ("ASHRAE 2004") and ASHRAE Publication "Best Practices for Datacom Facility Energy Efficiency, Second Edition", Atlanta, 2009 ("ASHRAE 2008"), each of which is incorporated by reference herein in its entirety. Each of these guidelines define an environmental envelope—a set of safe operating ranges for the data center.

Temperature and humidity have complex interrelated behavior. Psychometrics is the field of engineering concerned with behavior of mixtures of air and water vapor under varying conditions of heat. This behavior must be taken into account when both monitoring and controlling the temperature and humidity of a data center. Therefore the ASHRAE guidelines are best displayed as an envelope on a psychrometric chart to show acceptable environmental values. A psychrometric chart embodies the complex interrelation of humidity and temperature. FIG. 1 shows psychrometric chart 102.

Dry air exists when all of the contaminants and water vapor have been removed from atmospheric air. Dry air is used as the reference in psychrometrics. Moist air is a mixture of dry air and water vapor. Air temperature is a measure of the sensible heat content of air. Sensible heat is related to the changes in temperature that do not alter the moisture content of air. Latent Heat is related to level of moisture in the air. The total heat of the air, or enthalpy, includes the sensible and latent heat.

The dry bulb temperature is the air temperature determined by an ordinary thermometer. The dry bulb temperature axis 104 is located at the base of the chart. Vertical lines indicate constant dry bulb temperature.

Wet bulb temperature is the temperature reading from a wetted bulb that gives a direct indication as to the total heat content of air. It reflects the cooling effect of evaporating water. Wet bulb temperature can be determined by passing air over a thermometer that has been wrapped with a small amount of moist cloth. The cooling effect of the evaporating water causes a lower temperature compared to the dry bulb air temperature. The wet bulb temperature axis 108 is located along the curved upper left portion of the chart. The downward right sloping lines indicate equal wet bulb temperatures.

Dew point temperature is the temperature below which moisture will condense out of air. Air that is holding as much water vapor as possible is saturated or at its dew point. Water will condense on a surface that is at or below the dew point temperature of the air. The dew point temperature axis is located along the same curved portion of the chart as the wet bulb temperature axis. Horizontal lines of dew point temperature 109 indicate constant dew point temperature.

The absolute humidity or the humidity ratio is the ratio of the mass of the moisture present in the sample to the total volume of the sample. This quantity is also known as the water vapor density. The humidity ration axis 106 is located at the right of the chart. Horizontal lines would indicate equal humidity ratio.

Relative humidity is a measure of how much moisture is present compared to how much moisture the air could hold at that temperature. Lines 110 representing conditions of equal relative humidities sweep from the lower left to the upper right of the psychrometric chart.

The 100 percent relative humidity (saturation) line corresponds to the wet bulb and the dew point temperature axis line. The line for zero percent relative humidity falls along the dry bulb temperature axis line. Thus the psychrometric chart correlates five physical properties—1) Dry bulb temperature, 2) Relative humidity, 3) Wet bulb temperature, 4) Dew point temperature, and 5) absolute humidity. Knowledge of any two properties will yield the other three remaining properties. Thus the psychrometric chart embodies the relationship of these variables at a given pressure, usually sea level. These variables are also related, in some charts, to the latent and specific heat as well as the specific volume.

Sensors are typically deployed in a data center to monitor both temperature and relative humidity. The density of sensor deployment varies widely, but a sensor every 15 feet in a datacenter is not atypical. Such sensors often include both temperature and relative humidity measurements. From these two pieces of information all other psychrometric variables can be derived assuming the air pressure at sea level. Such sensor data must be evaluated against the ASRAE envelope in order to evaluate if the datacenter is operating at a safe temperature and humidity.

Heretofore, data center operations have typically not used this sensor data in a manner that includes explicit consideration of the psychrometric variables for the equipment safety and energy-efficient operation of the data center. These considerations have recently become unavoidable. In particular, then ASHRAE 2008 guidelines define an envelope that must be considered in psychrometric context. The ASHRAE 2008 guidelines were created to allow for more energy efficient cooling of data centers relative to the old AHSRAE 2004 envelope. Where the ASHRAE 2004 envelope can be defined by a simple range of relative humidity and dry bulb temperature, the ASHRAE 2008 envelope is defined by more than two psychrometric variables and is best understood by humans on a psychrometric chart. In other words, the ASHRAE 2004 envelope was defined by 4 variables ($T_{DRYHI}$, $T_{DRYLO}$, $RH_{LO}$ $RH_{HI}$) The 2004 specifications were bounded between 20 to 25° C. (68 to 77° F.) and 40 to 55% RH. Change in the 2008 ASHRAE standards included decreasing the dry bulb lower limit to 18° C. (64.4° F.), and increasing the upper limit to 27° C. (80.6° F.) The moisture limits were lowered to a 5.5° C. (41.9° F.) dew point and increased to 60% RH & 15° C. (59° F.) dew point. In order to take advantage of ASHRAE 2008 envelope a psychrometric chart should be checked by a human operator with the environmental data against the envelope and to direct a response. It is impractical to plot such constant data checking by hand. Heretofore the industry has not taken advantage of automated methods and systems of using a psychrometric chart to check the environmental data against the ASHRAE guidelines by an operator.

SUMMARY OF THE INVENTION

In one or more specific embodiments, the invention may provide a system for displaying sensor data information in a data center. The system includes a plurality of environmental sensors generating a plurality of sensor data sets, a first network connected to the plurality of environmental sensors. It further includes a monitoring system connected to the first network and a second network configured to receive said plurality of sensor data sets over the first network, to process said plurality of sensor data sets into a psychrometric chart, and to transmit said psychrometric chart over said second network. It further includes a computer connected to the second network having a user interface configured to receive the psychrometric chart over the second network and display the psychrometric chart. The psychometric chart displays a plurality of data points, each of which corresponds to one of the plurality of sensor data sets.

Another embodiment of the present invention provides for a method of displaying temperature and humidity sensor data by transmitting a data set including temperature data and relative humidity from one of a plurality of data sensors to a monitoring system, then plotting said data set as a data point on a psychrometric chart, and then transmitting updates of said psychrometric chart to a user interface.

BRIEF DESCRIPTION OF THE DRAWINGS

For the purposes of illustration, there are forms shown in the drawings that are presently preferred, it being understood, however, that the invention is not limited to the precise arrangements and instrumentalities shown.

FIG. 7 shows pseudo-code of one aspect of the present invention.

DETAILED DESCRIPTION OF PREFERRED EMBODIMENTS

Figure 1:
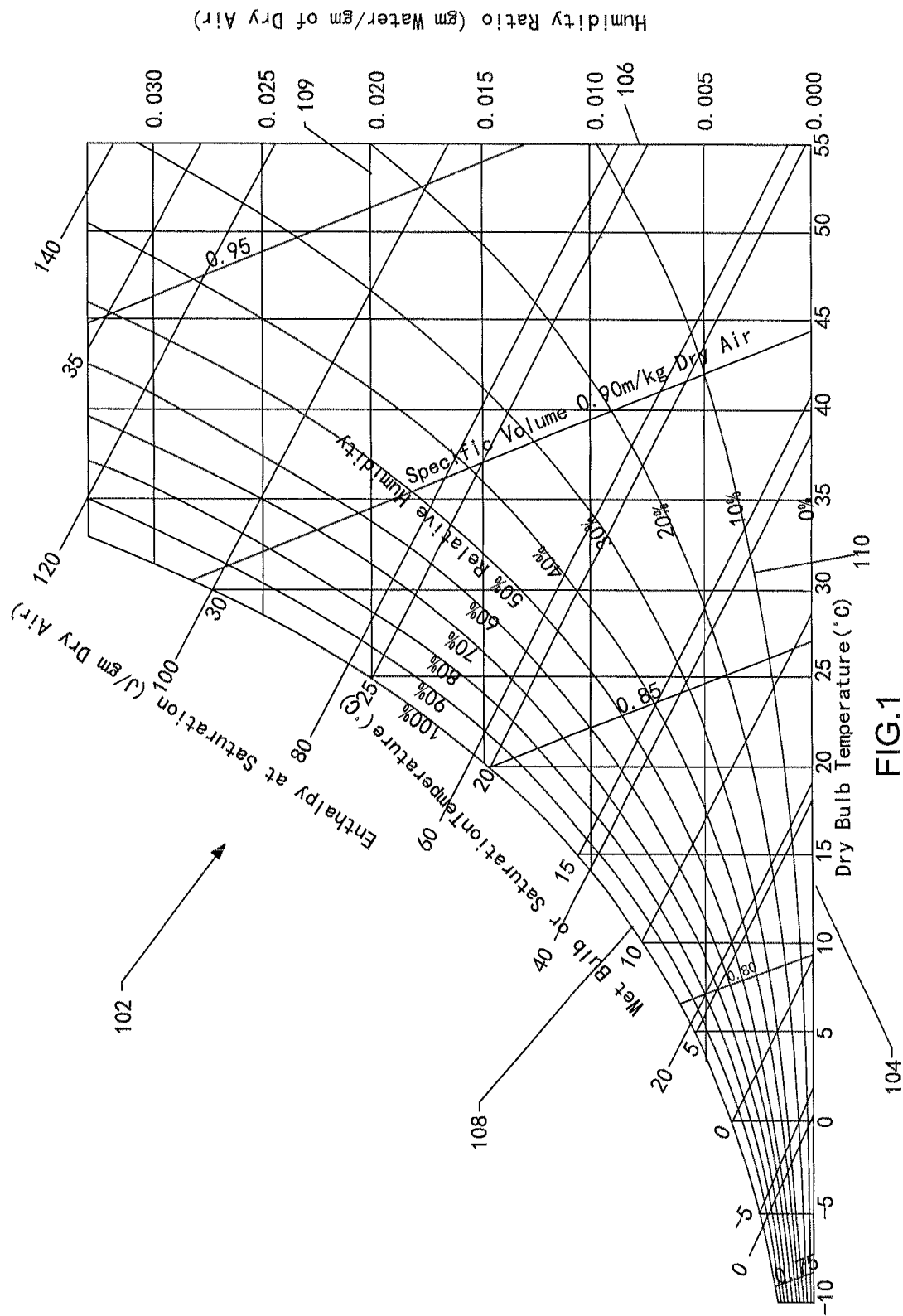
FIG. 1 is a generic psychrometric chart.
Figure 2:
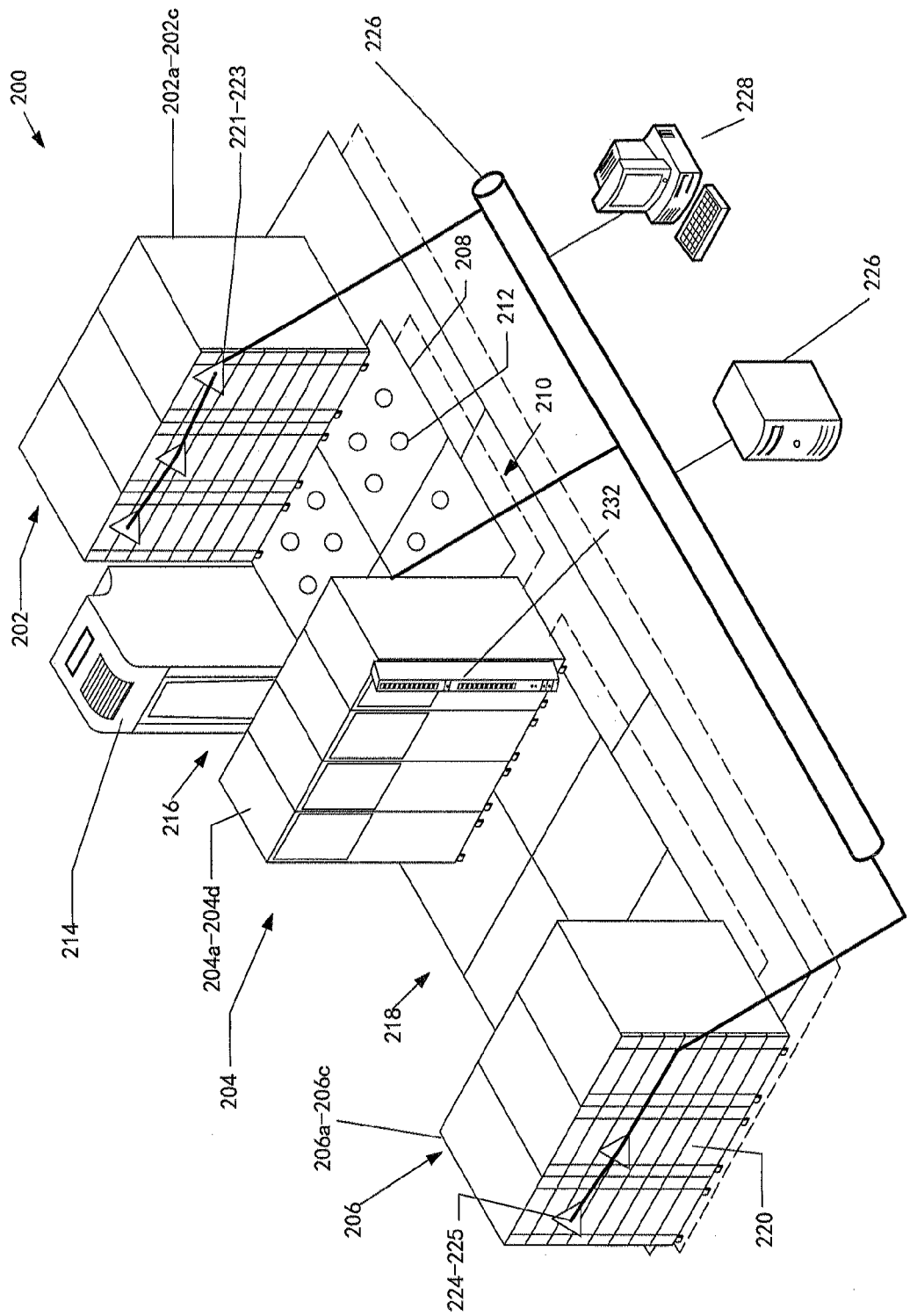
FIG. 2 is a schematic diagram of a one embodiment of the present invention.

With reference to FIG. 2 there is shown in simplified perspective a data center 200. The data center 200 is depicted as having a plurality of racks 202-206 aligned in parallel rows. Each of the rows of racks 202-206 is shown containing a number of racks 202a-202c, 204a-204d, and 206a-206c positioned on the raised floor 208. A plurality of wires and communication lines may be located in space 210 below floor 208. The space 201 may also function as a plenum for delivery of cooled air from one or more Computer Room Air Conditioners (CRAC) 214 through vent tiles 212. These vent tiles 212 are located in "cool aisles" such as cool aisle 216. Cool aisle 216 is located between server rows 202 and 204. Warm aisle 218 does not have vent tiles. Warm aisle 218 is located between rows 204 and 206. The sides of the racks of 202 and 204 which faced the cool aisle 216 are the front of the racks and the sides of the server rows 204 and 206 facing cool aisle to 18 are the back of the servers.

In normal operation cool air flows through the vented tiles 212 to the fronts of the racks 202 and 204. The cool air passes through the racks. The cool air flows through the back of row 204 into cool aisle 216. The air is then returned to CRAC 214 through ventilation (not shown).

Row of racks 202-206 each contains a number of racks 202a-c, 204 a-d, and 206a-c. Each rack contains a plurality of components 220. Components 220 or any of a number of systems and subsystems such as computers, servers, and switches. Components 220 gave off a relatively large amount of heat. On the front of racks 202-206 are deployed sensors. Sensors 221-225 are able to sense both dry bulb temperature and relative humidity. Sensors 221-225 are connected to network 226. Further connected to network 226 is monitoring system 228 and workstation 230. In operation sensors 221-225 send temperature and relative humidity data through network 226 to monitoring system 228.

And it should be readily apparent to those of ordinary skill in the art that the data center 200 depicted in FIG. 2 represents a generalized illustration and that other components may be added or existing components may be removed or modified without departing from the scope of the invention. For example, the data center 200 may include any number of racks in various other components. These components 200 may be arrayed vertically or horizontally in the racks. Further data center 200 may include number of racks and rack rows. Further data center 200 may include alternate air flow patterns. In one example, air flow may be through dedicated ducting.

The air conditioners used in data centers are typically precision air conditioning systems. This distinguishes them from comfort air conditioning systems are designed for the comfort of people, not the protection of computer-based electrical systems. Precision air conditioning systems are typically more reliable, have greater cooling capacity, and are more precise. Modern precision air conditioning systems are typically microprocessor controlled and are also accessible and controllable by operators remotely over wire through the use of a number of standard protocols such as MODBUS.

In overview, precision air conditioning systems are classified by size (cooling capacity), method of heat rejection (air cooled, water cooled, glycol cooled, or chilled water) and mounting location (floor, wall or ceiling). In an air-cooled system the refrigerant is directed through a condenser (normally outdoors) where it transfers heat to the environment. Such a system is called a Computer Room Air Conditioner (CRAC), In a water-cooled system the heat is removed from the refrigerant in a condenser (heat exchanger normally within the indoor unit) by water. Such a system is called a Computer Room Air Handler (CRAH).

CRAC 214 may be a Computer Room Air Handler ("CRAH"). CRAC 214 is currently shown as an "in-row" cooler. Alternatively, CRAC 214 may be an "in-rack" cooler. Alternatively CRAC 214 may be an "in-room" cooler.

Network 226 may utilize any of a number of protocols including IPMI, SNMP, Ethernet and others. In an alternative embodiment, network 226 is a wireless network using such protocols as 802.11n. This illustrative embodiment shows network 226 as an Ethernet network used both by monitoring system 228 to receive temperature and humidity data from the sensors 221-225 as well as to transmit information from monitoring system 228 to workstation 230. In another embodiment, the network 226 may be divided into a first network serving to connecting sensors 221-225 and a second network connecting monitoring system 228 to workstation 230.

In the present invention at least one of sensors 221-225 is a relative humidity sensor. However, typically such sensors are combination temperature and humidity sensors. For example, such sensors may stand independent or may be part of another component 220. For example, a sensor may be an integral to or attached to a Power Distribution Unit ("PDU") such as PDU 232. Thus the sensors need not be directly connected to network 226, but must at least be in communication with it.

Monitoring system 228 may be an application running on a server. Monitoring system 228 may be a combination of hardware and software and may consist of a number of hardware components running on one or several software programs. In one embodiment monitoring system 228 may be a software application running on a virtual machine itself running on one or a number of hardware servers. Alternatively, monitoring system 228 may be a dedicated server appliance. In another embodiment the monitoring system 228 includes a web server in order to communicate information to workstation 230. Workstation 230 may be any computer, including a tablet or notebook computer. In the illustrative embodiment workstation 230 implements a web browser which is used as a user interface for the monitor system 228.

Figure 3:
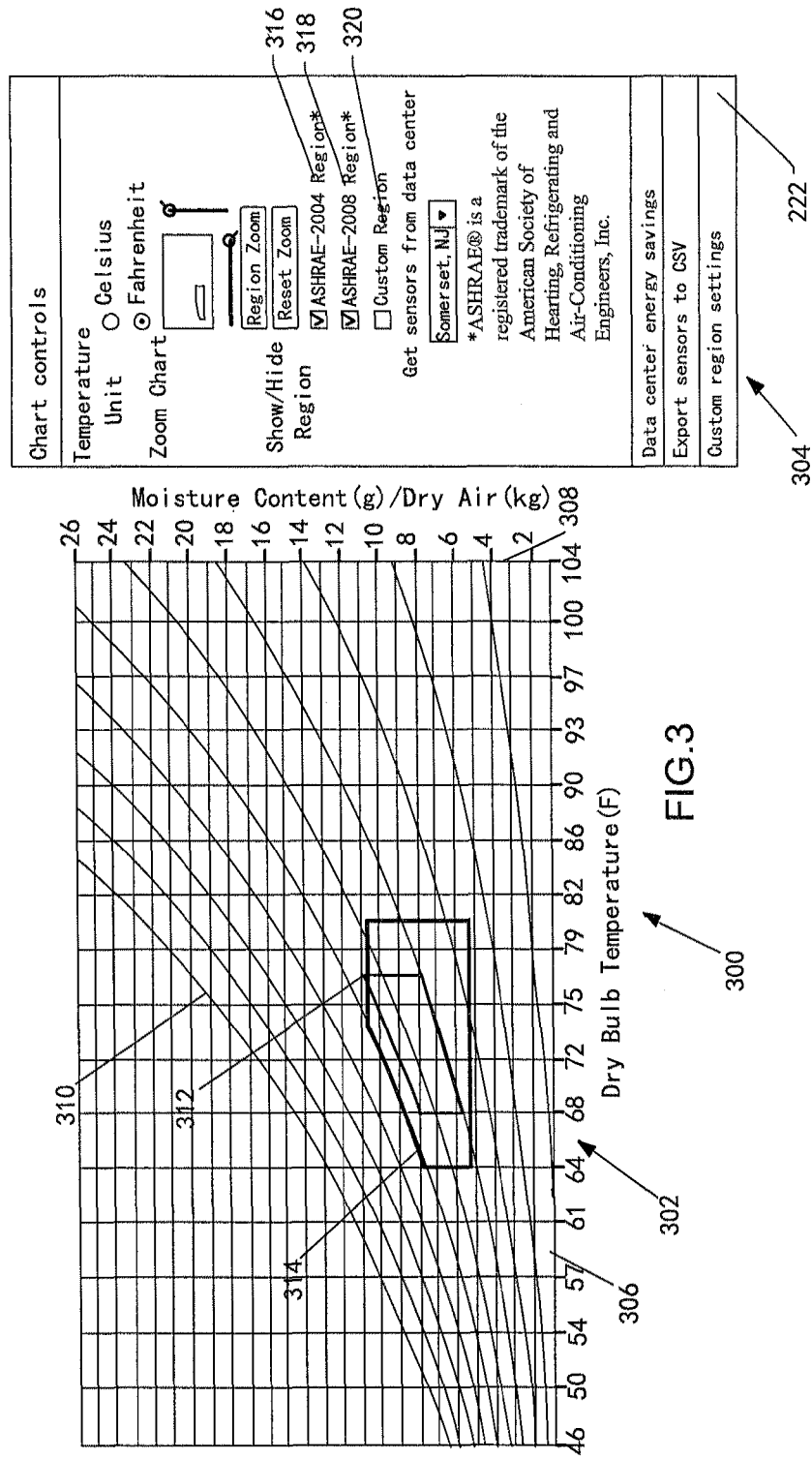
FIG. 3 is a screenshot of one embodiment of the present invention.

FIG. 3 shows a user interface 300 which displays processed temperature and humidity data on the workstation 230 of monitoring system 238. User interface 300 has a simplified psychrometric chart 302 and control interfaces 304. Simplified psychrometric chart 302 as a dry bulb temperature axis 306, a humidity ratio axis 308, and relative humidity lines 310. Shown on the psychrometric chart 302 is the ASHRAE 2004 envelope 312 and the ASHRAE 2008 envelope 314. Control interface 304 includes checkbox 316 to display envelope 312 and checkbox 318 to activate envelope 314. It also includes customizable option 322. Option 322 enables the user to construct a custom envelope. Such a user defined custom envelope may be advantageous if the performance constraints of the specific components 220 are known for the manufacturer. In one embodiment of the present invention, the User Interface 300 is instantiated in a browser such as Mozilla FIREFOX. Psychrometric chart 302 can be instantiated in ADOBE Flash or in HTML 5. In that embodiment, the user interface requires no downloading of separate applications to the workstation 230. In another embodiment, workstation 230 implements a standalone application ass User Interface 300.

Figure 4:
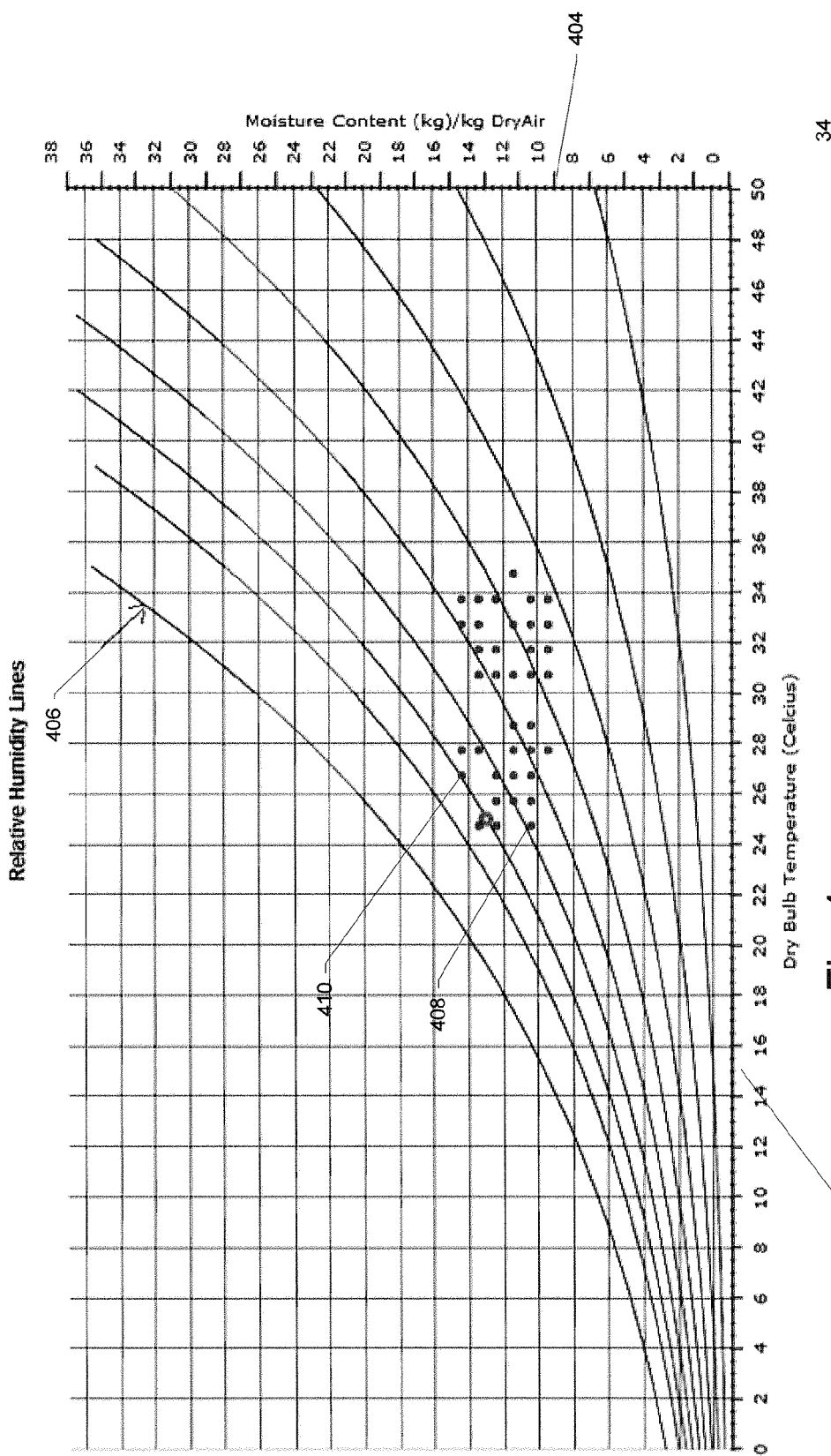
FIG. 4 is a screenshot of one embodiment of the present invention showing sensor data but not showing the boundary region in a psychrometric chart in one embodiment of the present invention.

FIG. 4 shows a psychrometric chart 400 from user interface 300 having data points. Dry bulb temperature axis 402 and humidity ratio axis 404 as well as relative humidity lines 406 are used to plot data points such as data points 408 and 410.

Figure 5:
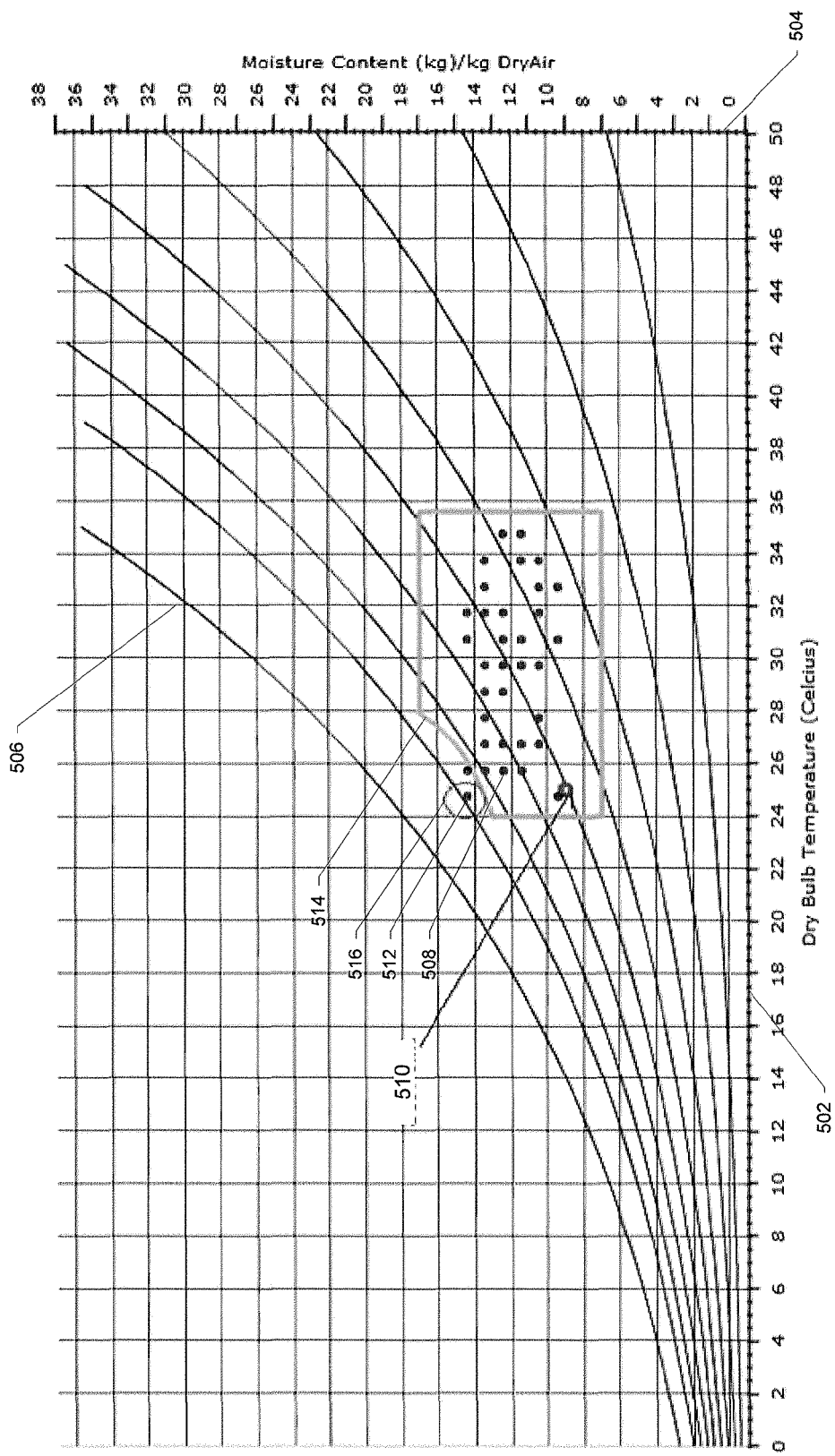
FIG. 5 is a screenshot of one embodiment of the present invention showing sensor data and showing the boundary region in a psychrometric chart.

FIG. 5 shows a psychrometric chart 500 having a dry bulb temperature axis 502, a humidity ratio axis 504 and relative humidity lines 506. A number of data points are shown, including data points 508, 510, and 512. Custom envelope 514 is shown. Data point 512 is highlighted by ring 516. The monitoring system 228 has highlighted data point 512 as data point 512 is outside the custom envelope 514.

Figure 6:
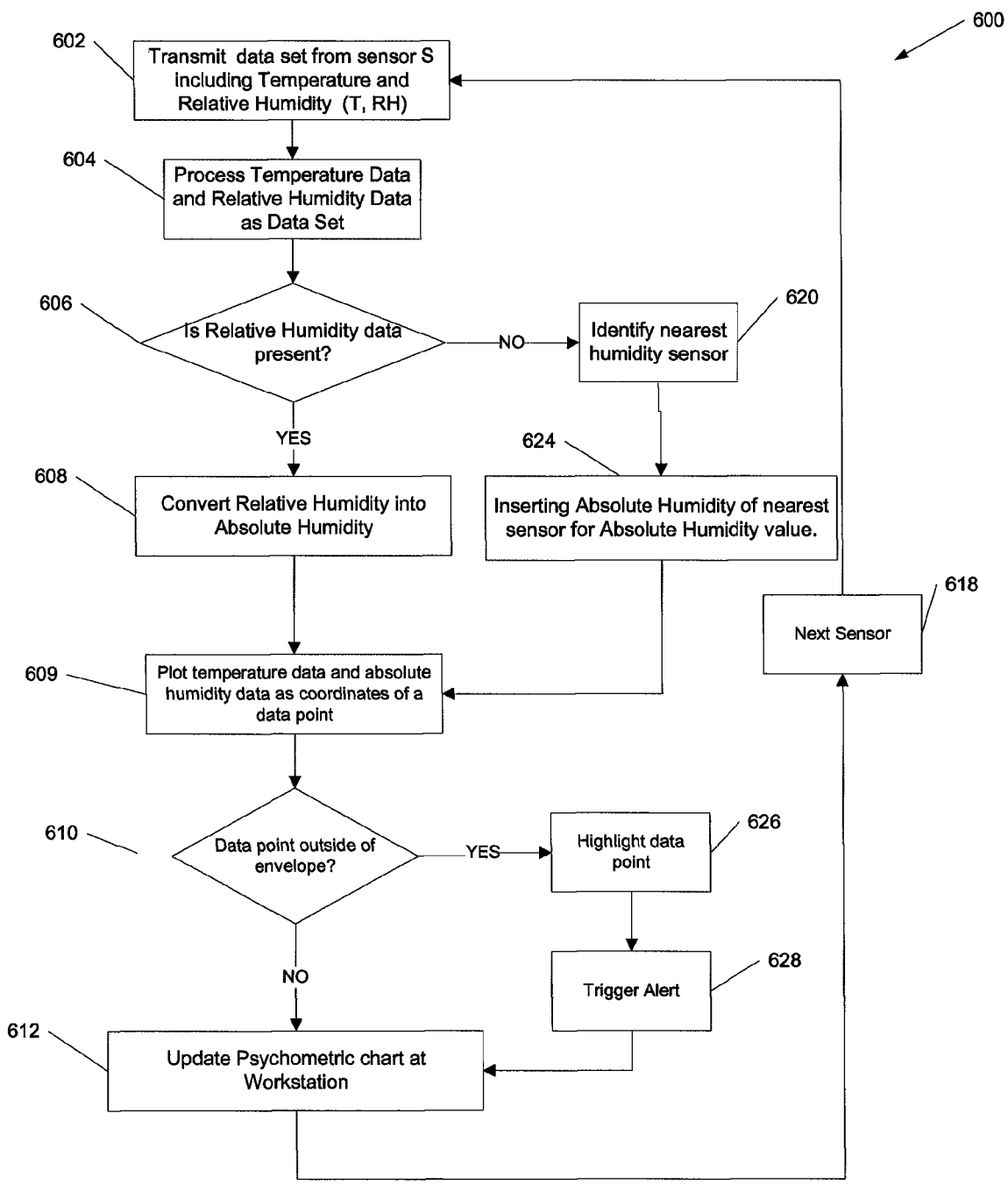
FIG. 6 shows a flowchart showing the operation of one embodiment of the present invention.

FIG. 6 shows a flow chart 600 of the operation of one embodiment of the present invention. In step 602 a sensor S such as sensor 221-225 transmits its data to the monitoring system 228. This data will typically include both dry bulb temperature data and the relative humidity data into a data set which can be summarized as T, RH. The transmitted data set may also include a time stamp. The transmitted data set may also include identification data such as, for example, a sensor ID number. The transmitted data set may also include location data such as, for example, a row number, rack number and component height in rack. Alternatively, the location information could be in an x, y, z coordinate space. In step 604 monitoring system 228 processes this transmitted data set including (T, RH). This includes any processes necessary to convert the data into a usable form. For example, unit conversions from Fahrenheit to Celsius or back for temperature may be provided as the operator requests.

In step 606 the transmitted data set is checked for the presence of relative humidity data by the monitoring system 228. It is possible for some of the sensors 221-225 to be only temperature sensors and thus only send temperature data without relatively humidity data. If there is relative humidity data present, then the algorithm proceeds to step 608.

In steps 608, assuming relative humidity data is present, the relative humidity data is converted by the monitor system 228 to absolute humidity data given the temperature data and assuming pressure at sea level and the absolute humidity data is added to the data set. This conversion is well known to one skilled in the art of psychrometrics. In one embodiment of the present invention, FIG. 7 shows the pseudo-code for the conversion. The dew point is calculated from the temperature and relative humidity, and then the absolute humidity (called mixratio in FIG. 7) is calculated from this dew point assuming pressure at sea level.

In step 609 the monitor system 228 plots the data set of sensor S on a psychrometric chart using data temperature as the X coordinate and absolute humidity as the y coordinates.

In step 610 the temperature data, the relative humidity data and the absolute humidity data of the data set are checked against any environmental envelope selected, including ASHRAE 2004, ASHRAE 2008, and custom envelopes. If the data set is inside the environmental envelope, then the algorithm proceeds to step 612. If the monitor system 228 in step 606 determines the relative humidity data is not present in the data as the sensor S is responsible for that data set is just a temperature sensor then in step 620 the monitor system identifies the nearest humidity sensor. Such a location may be stepped by hierarchy. For example, a check to see if a humidity sensor is on the same rack, then in the same row, then in the same room. In step 624 the absolute humidity (calculated as step 608 from relative humidity data of that sensor) of this nearest sensor is then used as the absolute humidity of sensor S in order to plot the data sensor as a data point on the psychrometric chart in step 609.

In step 626, if in step 610 the monitor system 228 determines that the data point of sensor S is outside the envelope selected by the operator, then the data point is highlighted as for instance highlight 516. In addition or alternatively to the highlight 516 of being encircled, a different color could be applied and the data point could change character (to an "X" or other mark) and the data point could flash. In step 628 the data monitor triggers an alert. The alert may be an email, an audible alarm, a text message or any other predetermined communication to an operator.

In step 612 the psychrometric chart displayed at workstation 630 is updated by data monitor 628 with data point of Sensor S. Updating may include sending just the changes made to the psychrometric chart or transmitting an entirely new psychrometric chart. In step 618 monitor system 228 the counter is advanced as S=S+1 and the next sensor is processed.

It is to be understood that that while the illustrative embodiment of FIG. 6 processes the sensor data in a serial, iterative manner, the monitor system 228 could easily be performed as a batch process in which multiple sensor data sets are processed through each step before advancing to the next step.

Thus the embodiments of the present invention allow an operator to better monitor and control the safe and energy-efficient operation of a data center by explicitly showing the environmental state in a psychrometric context. For example, an operator may easily monitor a large number of sensors over an extended period are sensing data which would place the sensor outside of the environmental envelope of safe operation such as ASHRAE 2008 envelope. By adjusting the environmental controls the operator can now safe energy by running the data center at the highest possible temperature (thus minimizing energy using cooling) for a given both relative and absolute humidity). Further, highlights and alerts may be triggered based on this psychrometric data to further assist in monitoring the environmental state of the data center.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

The invention claimed is:

1. A method for displaying temperature and humidity sensor data provided by a plurality of sensors distributed within a data center at a user interface, comprising the steps of:
   a) receiving a data set from each of the plurality of sensors comprising temperature data and location data for the sensor;
   b) identifying one or more sensor data sets including relative humidity data for the sensor,
   c) calculating absolute humidity data for the one or more sensor data sets as a function of the temperature data and the relative humidity data;
   d) identifying at least one sensor data set having no relative humidity data;
   e) identifying another one of the plurality of sensors as a nearest sensor having absolute humidity data as a function of the location data,
   d) inserting a copy of the absolute humidity data from the nearest sensor in the data set of the one sensor having no relative humidity data;
   e) plotting each of said data sets as a data point on a psychrometric chart; and
   f) transmitting image data for said psychrometric chart to the user interface.

2. The method of claim 1, comprising the additional steps of:
   g) determining that one of the data points is outside an environmental envelope; and
   h) visually highlighting the one data point.

3. The method of claim 2, comprising the step of customizing an environmental envelope by a user at the user interface for display on the psychrometric chart.

4. The method of claim 1, comprising the additional step of selecting an environmental envelope by a user at the user interface for display on the psychrometric chart.

5. The method of claim 1, wherein the location data identifies an equipment rack position.

6. The method of claim 5, wherein the equipment rack position identifies one or more of a row number, a rack number or a sensor height within the rack.

7. The method of claim 1, wherein the location data identifies a position of the sensor in x-y-z coordinate space.

8. A monitoring system for monitoring temperature and humidity sensor data provided by a plurality of sensors distributed within a data center at a user interface, the monitoring system comprising:
   a computer connected to a first and second network, and
   a stored program executed on said computer and causing said computer to perform the steps of:
   a) receiving a plurality of sensor data sets from the first network each comprising temperature data and location data for a sensor,
   b) identifying one or more sensor data sets including relative humidity data,
   c) calculating absolute humidity data for the one or more sensor data sets as a function of the temperature data and the relative humidity data,
   d) identifying at least one sensor data set having no relative humidity data;
   e) identifying another one of the plurality of sensors as a nearest sensor having absolute humidity data as a function of the location data,
   d) inserting a copy of the absolute humidity data from the nearest sensor in the data set of the one sensor having no relative humidity data;
   e) plotting each of said plurality of sensor data sets on a psychrometric chart, and
   f) transmitting image data the psychrometric chart over the second network to the user interface.

9. The monitoring system of claim 8, wherein the stored program is further executed on said computer to cause said computer to prepare an environmental envelope for display on the psychrometric chart.

10. The system of claim 9, wherein the environmental envelope may be defined by the operator to conform to an ASHRAE standard.

11. The system of claim 9, wherein the environmental envelope may be customized by the operator as distinct from an ASHRAE standard.

12. The system of claim 8, wherein the first and second networks comprise a single network.

13. The system of claim 8, wherein one or more of said sensor data sets further include sensor identification data.

* * * * *